United States Patent [19]
Gangi

[11] Patent Number: 5,989,373
[45] Date of Patent: Nov. 23, 1999

[54] METHOD OF MAKING VINYL TRIMMINGS FOR LEATHER UPHOLSTERY

[76] Inventor: Richard P. Gangi, HC2, Box 7, Rte. 145, Durham, N.Y. 12422

[21] Appl. No.: 08/887,316

[22] Filed: Jul. 3, 1997

Related U.S. Application Data

[60] Provisional application No. 60/021,241, Jul. 3, 1996.

[51] Int. Cl.⁶ ..................................................... B32B 3/04
[52] U.S. Cl. .............................. 156/93; 156/148; 428/123
[58] Field of Search .............................. 156/93, 177, 178, 156/148, 438; 428/123

[56] References Cited

U.S. PATENT DOCUMENTS

| | | | |
|---|---|---|---|
| 1,688,094 | 10/1928 | Strout | 428/123 |
| 2,028,494 | 1/1936 | Blanchet | 156/438 |
| 2,074,580 | 3/1937 | Fourness | 156/438 |
| 3,320,110 | 5/1967 | Gallagher | 156/438 |
| 3,622,433 | 11/1971 | Clark | 428/123 |
| 4,201,032 | 5/1980 | Sangalli | 156/438 |
| 4,270,963 | 6/1981 | Howat | 156/438 |

*Primary Examiner*—Daniel Stemmer
*Attorney, Agent, or Firm*—Levine & Mandelbaum

[57] ABSTRACT

Decorative cords for leather, vinyl or leather and vinyl furniture are made by feeding a strip of vinyl and lengths of one or more filler yarns through a hollow cylindrical feeder tube which causes the longitudinal edges of the vinyl strip to wrap around the filler yarns and meet where they are welded together to form a tubular cord structure with an almost invisible seam. A plurality of such cords may be twisted together and welded to form multi-ply cords for decorating furniture. A tab may be welded along the length of the cords for being sewn into the seam of an upholstered cushion or the like.

2 Claims, 4 Drawing Sheets

METHOD OF MAKING VINYL TRIMMINGS FOR LEATHER UPHOLSTERY

This application claims the benefit of U.S. Provisional Application No. 60/021,241, filed Jul. 3, 1996.

BACKGROUND OF THE INVENTION

This invention relates to trimmings for leather upholstery used on furniture such as sofas, chairs and the like. More specifically, the invention is directed to a method of making cords from vinyl which are suitable for decorating furniture upholstered in leather.

It is known in the furniture business to trim fabric upholstery with twisted cords manufactured from many strands of yarn. Such cords are widely used to trim the circumferences of sofa and chair cushions upholstered with fabric. They are used on throw pillows and the like.

Prior art twisted cords are not made from vinyl or leather for several reasons. First, there is a limit to how long a strip of leather can be since leather is obtain from hides which are of limited dimension. Secondly, only one side of a leather strip is useable for decorative purposes. A cord for trimming upholstery must have virtually its entire circumference visible.

Although it is known to glue strips of hide, end to end, to overcome the aforementioned limitations on length, this solution does not solve the problem of hiding the unfinished side of a leather strip. Nor does the use of vinyl, in its now offered form, circumvent the problem of a using a strip having only one side which is aesthetically suitable for use on upholstery.

SUMMARY OF THE INVENTION

The aforementioned problems of the prior art are overcome by the instant invention which provides for the manufacture of decorative cords for leather, vinyl or leather and vinyl furniture by feeding a strip of vinyl and lengths of one or more fill yarns through a hollow cylindrical feeder tube which causes the longitudinal edges of the vinyl strip to wrap around the filler yarns and meet where they are welded together to form a tubular cord structure with an almost invisible seam. A plurality of such cords may be twisted together and weld to form multi-ply cords for decorating furniture. A tab may be welded along the length of the cords for being sewn into the seam of an upholstered cushion or the like.

It is therefore an object of the invention to provide a decorative cord made of vinyl which can be attached to leather upholstered furniture.

Another object of the invention is to provide a decorative cord made of vinyl which has no readily visible seam.

Still another object of the invention is to provide a compound decorative cord made of vinyl and having multiple plies, which can be attached to leather upholstered furniture.

A further object of the invention is to provide a single or compound decorative cord made of vinyl of predetermined thickness.

Still a further object of the invention is to provide a single or compound decorative cord made of vinyl with a tab for sewing into the seam of leather upholstered furniture.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
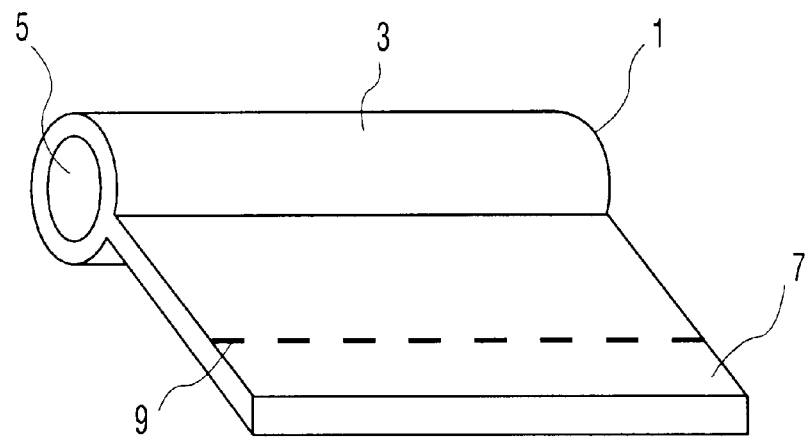
FIG. 1 is a perspective view of a leather or vinyl cord being prepared in accordance with a first method known in the prior art.

The preferred embodiment will now be described with reference to the prior art. Referring to FIG. 1 of the drawings, a conventional piping 1 is formed by wrapping a length of vinyl 3 about a core formed from yarn fillers 5. The edges of the strip are then sewn along their length thereby leaving a longitudinal running tab 7 with a exposed stitch seam 9. This type of construction is commonly used with fabrics in home furnishings and wearing apparel.

Figure 2:
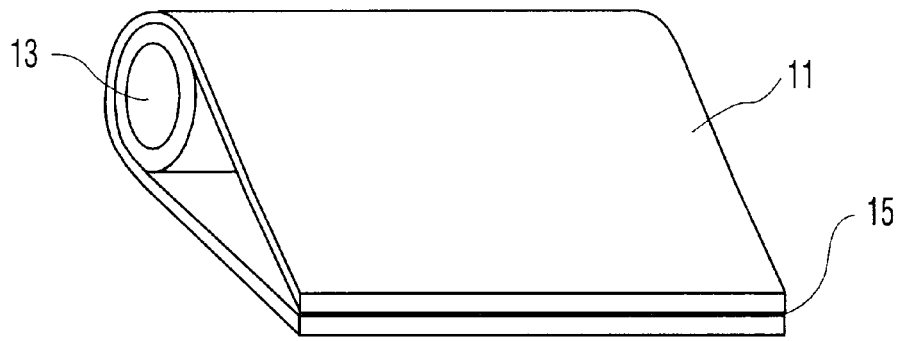
FIG. 2 is a perspective view of a leather cord being prepared in accordance with a second method known in the prior art.

A variation of the construction shown in FIG. 1, useful for vinyl constructions is shown in FIG. 2. There a vinyl strip 11 is wrapped around a yarn filler 13 and the undersides of the edges are welded together at 15, face to face, again leaving an exposed seam.

Figure 3:
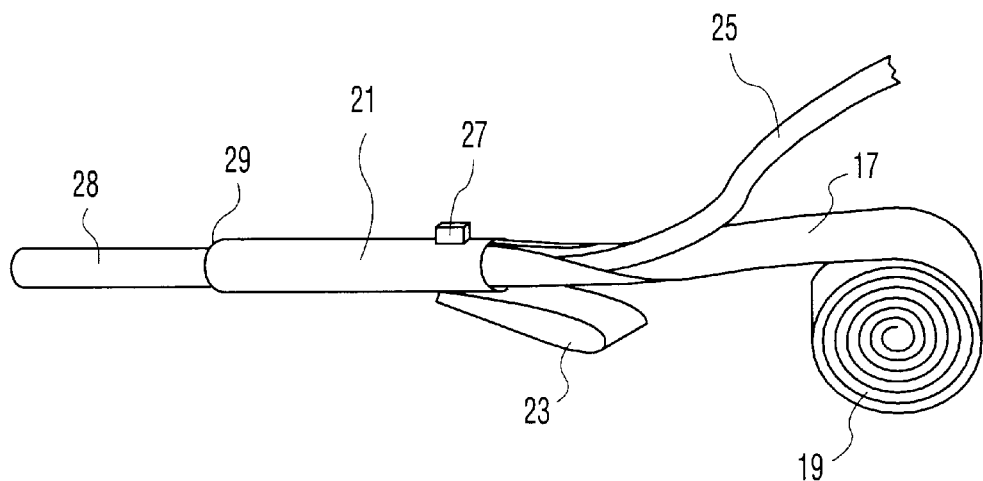
FIG. 3 is a three-dimensional schematic view of a vinyl cord being made in accordance with the preferred embodiment of the invention.

Referring now to FIG. 3, a method of making a piping is shown wherein strips of vinyl are slit into a given width and folded over a filler, such as a yarn or twine. The vinyl is sit into strips having a width of about ½ inch. The width of the strip may vary depending upon the desired outer dimension of the cord to be produced.

An elongated strip of vinyl 17 is provided on a spool 19. A former tube 21 has an inner circumference equal to or slightly small than the width of the vinyl strip. The strip is fed into the tube at a feeder foot 23 provided at the entranceway to the former tube 21, and the edges of the vinyl strip are turned radially inwardly where they meet to form a continuous hollow cylinder. Where the inner circumference of the former tube 21 is equal to the width of the vinyl strip, the edges of the strip can be brought into end-to-end abutment. By making the inner circumference of the former tube slightly less than the width of the strip, the edges of the strip can be made to overlap slightly. Alternatively, the former tube can be shaped to cause the edges of the strip to about and turn slightly inwardly so that the outer finished surfaces along both edges of the vinyl strip make mutual contact.

A yarn filler 25 from a supply (not shown) is feed into the opening in the cylinder formed by the vinyl strip 17. The yarn filler serves as the hidden core of the vinyl cord to be formed.

A heating element 27 is mounted on the former tube 21 at the circumference of the former tube where the edges of the vinyl strip meet or overlap. The vinyl is heated along the edges which are welded together to form a vinyl tube surrounding the central yarn core. The finished vinyl tube 28 or cord exits from the former tube 21 at 29.

The heated vinyl outer jacket can be cooled by ambient air as it exits the former tube 21. In the preferred embodiment of the invention, cooling air from a conventional blower (not shown) is applied to the vinyl weld near the place of exit of the vinyl wrapped yarn from the former tube.

The diameter of the finished cord or piping can be selected by choosing a vinyl strip width slightly greater than the desired circumference and a former tube 21 having an inner circumference equal to the desired circumference of the finished piping.

Figure 4:
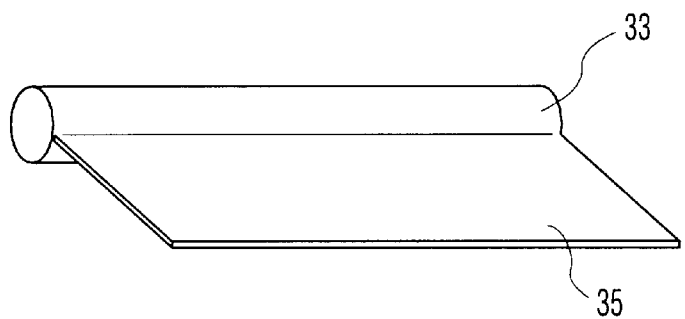
FIG. 4 is a three-dimensional schematic view showing the further processing of a the vinyl cord of FIG. 3 to form a compound cord suitable for use with leather upholstery.

Referring now to FIG. 4, it is seen that larger cords or trimmings based on such cords can be formed in accordance with the invention. Two more of the cords formed in accordance with the aforementioned method illustrated in and described with respect to FIG. 3 can be combined by twisting, weaving, or knitting, to form decorative cords having diameters larger than that of a single cord. The resulting multiplied cords can be introduced into a vinyl welder whereat the individual cords can be welded to one another to form an integral multi-ply cord.

As shown in FIG. 4, a multi-ply cord 33 may have a tab 35 welded to the cord 33 along its length for attaching the cord 33 to upholstered furniture by sewing the tab into a seam in the upholstery. In accordance with the preferred embodiment of the invention, the tab is one half inch in width or slightly wider, but other widths may be employed within the scope of the invention.

The above described invention provides for decorative vinyl cords having an almost invisible seam. The twisted cords made of vinyl, according to the invention, allow the manufacture of leather sofas with new range of adornments. Various diameters of cords, and mixtures of yarns and vinyl can be achieved by the invention.

The method of the invention also has application in furniture formed from hybrid materials. For example, many leather sofa manufacturers use a combination of real leather and vinyl in the same unit. Vinyls are offered in many gauges of thickness as well as surface textures. These textures have the look and feel of real leather. The vinyl fabric industry offers many different gauges and colors, as well as textures, which allow for a wide variety of effects.

EXAMPLE

Figure 5:
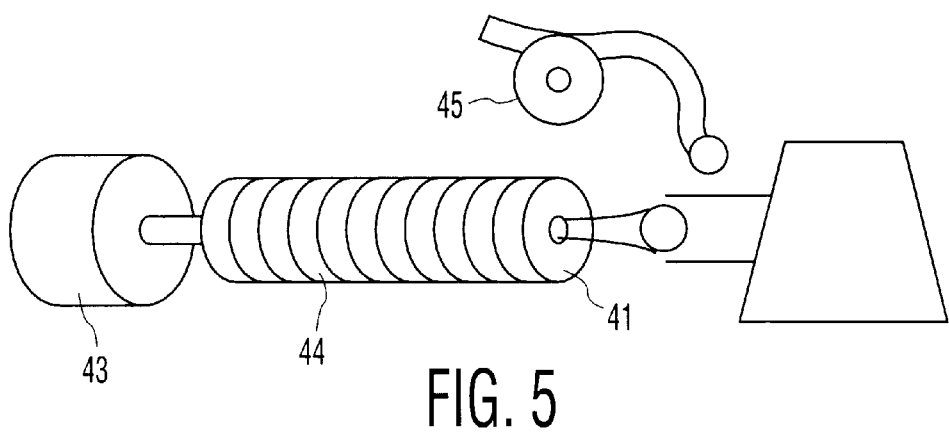
FIG. 5 is a schematic view showing cutters for the vinyl to be cut into strips for insertion into a shaping machine in accordance with the invention.
Figure 6:
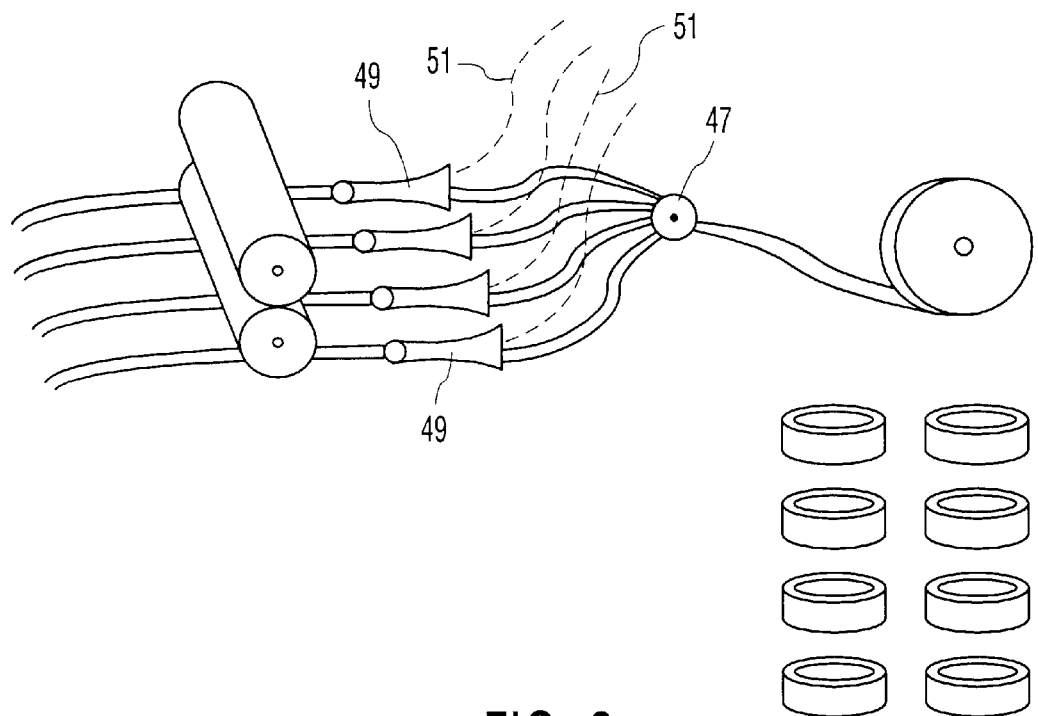
FIG. 6 is a schematic view showing cutting of the vinyl to be into strips for insertion into a shaping machine in accordance with the invention.

As shown in FIG. 5 60" vinyl on a spool 41 rotated by a motor 43 is slit by a circular cutting knife 45 into 2 inch wafers 44 in preparation for processing in a spaghetti welding machine. Assorted colors may be used. Referring now to FIG. 6, the 2 inch wafers are placed on a slitter 47 and cut into widths of specified dimensions. Four bands are then run into trumpet shaped die 49 into which a hot stream of air is injected through an orifice producing enough heat to form the vinyl around the diameter yarn or synthetic fiber 51 producing a ⅛" outer diameter spaghetti strand.

Figure 7:
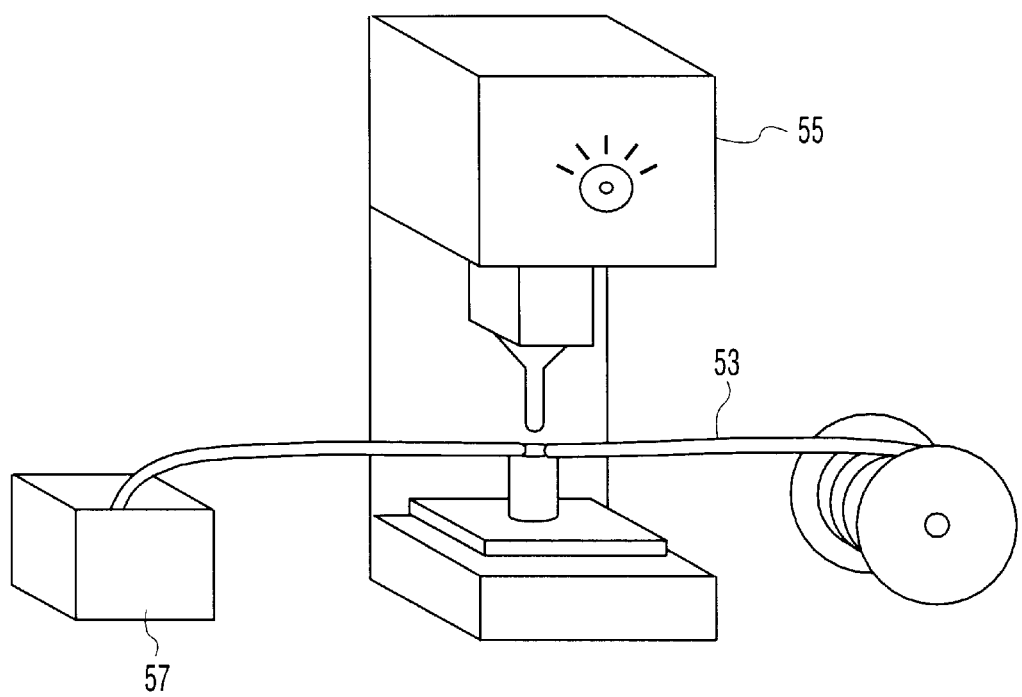
FIG. 7 is a perspective view showing welding of the spaghetti strands together in accordance with the invention.

Referring now to FIG. 7, individual lengths of the spaghetti strands 53 are linked or welded together on an ultrasonic welder 55 to form one continuous length of spaghetti. The spaghetti is preferably filled with a PVC type filler. The result is a very strong bond of the joined spaghetti. The spaghetti is placed in a box 57 as it comes off of the spaghetti welder 55. This ultrasonic welding of the individual spaghetti strands allows for an endless continuous length of spaghetti strands thereby permitting continuous running of the vinyl cords in a cost effective manner. This weld must be strategically strong and in some cases this is why a plastic or PVC filler yarn for the spaghetti is desired.

Figure 8:
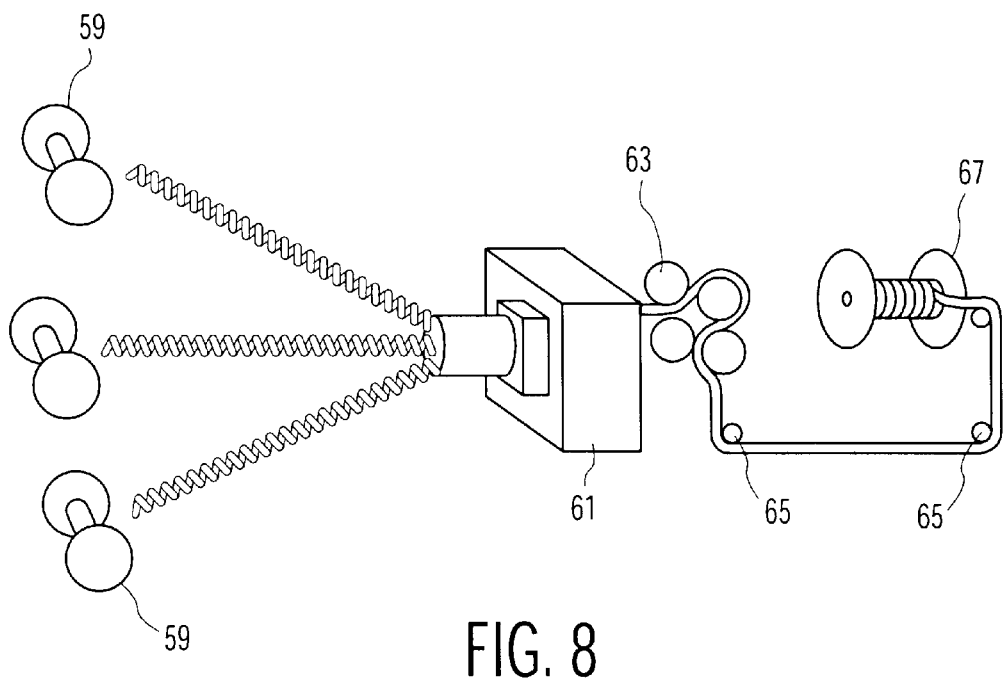
FIG. 8 is a perpsective view showing the twisting of the spaghetti strands in accordance with the invention.

Referring now to FIG. 8, the individual spaghetti's or strands are now twisted and subjected to torsion with a chosen number of turns per inch, depending on the desired appearance. In respect of the desired diameter cord, the strands are plied and twisted in a reverse manner locking them together, producing a given twisted cord. These strands or spaghettis can be co-mingled with yarn producing a collage effect of yarn and vinyl for a much desired look. The welded cords of spaghetti are fed from bobbins 59, which tension the cords, to a gear box 61 for twisting the spaghetti, and then over a series of pulleys 63 to apply additional torsion to the cords. Arms 65 wrap the twist cord onto take-up bobbin 67.

Figure 9:
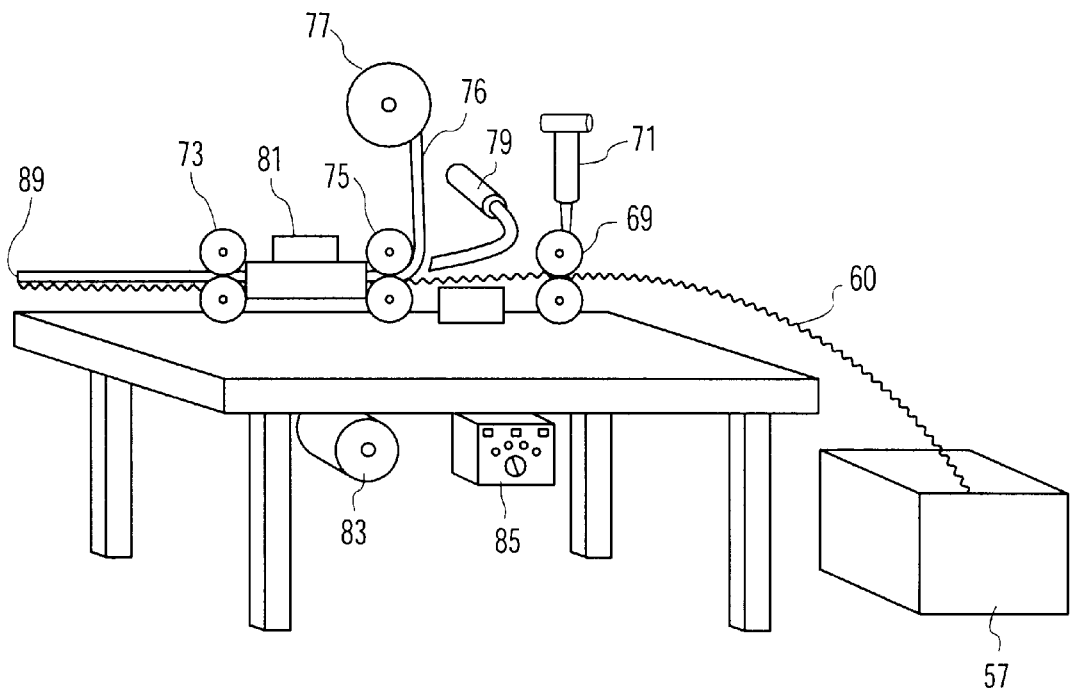
FIG. 9 is a perspective view showing the application of a tab to the cord in accordance with the invention in accordance with the invention.

These twisted cords of vinyl are next subjected to application of the vinyl tab. A machine used for the process has rollers, pneumatic air tensioners, flow guides and pneumatic air brakes. The speed at which the cords are transported through the machine is variable and can be controlled with respect to the heating element which can reach temperatures as high as 1200 degrees Fahrenheit causing a fusion of the vinyl tab essential for application of the cord to a sofa, or cushions. The tab acts as a holding element for the cord and imparts an aesthetically pleasing look to the sofa, cushion or other item to which the cord is attached. Referring to FIG. 9, The twisted cord 60 is passed from the box through rollers 69 tensioned by an air cylinder 71. The cord is fed from the box by take-up rollers 73, driven by a motor 83 having a control box 85, to rollers 75. The tab material 76 which is cut to a width of one inch is fed from a roll 77 to the rollers 75 for joining with the twisted cord 60. An air jet 79 forces air over an electric heating coil (not shown) for directing hot air at 1200 degrees at the tab material 76 as it passes from the roll 77 to the rollers 75 where the tab material 76 is joined with the twisted cord 60. Cooling air jets direct cool air at the joined tab 76 and twisted cord 60 as they exit the rollers 75 to help set the tab 76. The vinyl trimming 87 formed from the combined twisted cord 60 and tab 76 is then drawn passed take-up rollers 73 where is exits the machine.

It is to be appreciated that the foregoing is a description of a preferred embodiment of the invention to which variations and modifications may be made without departing from the spirit and scope of the invention. For example, instead of being fastened by welding, the edges of a strip of vinyl may be wrapped about a core of yarns and then sewn together. Preferably the ends of the strip would be turned inwardly to minimize the visibility of the seam.

What is claimed is:

1. A method of making vinyl trimmings for leather upholstery comprising, feeding a strip of vinyl and lengths of one or more filler yarns through a hollow cylindrical feeder tube causing the longitudinal edges of the vinyl strip to wrap around the filler yarns and meet, welding together the longitudinal edges of the vinyl strip to form a tubular cord structure, and making a plurality of such cords, twisting them together, and welding them to form multi-ply cords for decorating furniture.

2. A method of making vinyl trimmings for leather upholstery in accordance with claim 1 further comprising welding a tab along the length of the cords, and sewing the tab into the seam of an upholstered cushion or the like.

* * * * *